United States Patent [19]
Rasmussen

[11] Patent Number: 6,088,600
[45] Date of Patent: *Jul. 11, 2000

[54] DISCONTINUOUS TRANSMISSION OF CIRCUIT-SWITCHED ANALOG CELLULAR DATA

[75] Inventor: Kris A. Rasmussen, Tinton Falls, N.J.

[73] Assignee: Paradyne Corporation, Largo, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,225

[22] Filed: Mar. 12, 1996

[51] Int. Cl.$^7$ ...................................................... H04Q 7/20
[52] U.S. Cl. .......................... 455/574; 455/38.3; 455/343; 455/517; 455/557
[58] Field of Search ..................................... 455/38.3, 425, 455/466, 517, 556, 557, 574, 343; 375/219, 222; 379/93.26, 93.28

[56] References Cited

U.S. PATENT DOCUMENTS

| | | | |
|---|---|---|---|
| 4,697,281 | 9/1987 | O'Sullivan | 379/59 |
| 4,912,756 | 3/1990 | Hop | 379/60 |
| 5,479,480 | 12/1995 | Scott | 455/425 |
| 5,511,237 | 4/1996 | Sakaguchi | 455/79 |
| 5,602,869 | 2/1997 | Scott | 375/222 |
| 5,682,417 | 10/1997 | Nitta | 455/38.3 |

OTHER PUBLICATIONS

TIA/EIA Interim Standard IS–136.2, Telecommunications Industry Association, Dec. 1994, pp. i–vii, 98–100, 148–183.

Primary Examiner—Dwayne D. Bost
Assistant Examiner—Nay Maung
Attorney, Agent, or Firm—Thomas, Kayden, Horstemeyer & Risley, LLP

[57] ABSTRACT

A cellular modem couples a data terminal equipment (DTE) to a portable mobile telephone that includes a cellular transceiver. The cellular modem monitors the activity of a circuit-switched analog cellular data connection between the DTE and a far-end data endpoint, e.g., a computer, through a cellular modem pool in the network. If the circuit-switched analog cellular data connection is idle for a predetermined amount of time, the cellular modem initiates a power-down sequence. For example, the cellular modem uses a protocol, e.g., a predefined tone, to indicate to the cellular modem pool that a power-down is occurring and that the circuit-switched analog data connection is to be put on hold. Upon receiving an acknowledgment from the cellular modem pool, the cellular modem provides a power-down signal to the cellular transceiver, which activates the "Discontinuous Transmission" feature for cellular voice, treating the circuit-switched analog cellular data call just like it was a circuit-switched analog cellular voice call.

24 Claims, 3 Drawing Sheets

DISCONTINUOUS TRANSMISSION OF CIRCUIT-SWITCHED ANALOG CELLULAR DATA

BACKGROUND OF THE INVENTION

The present invention relates to end-user cellular communications equipment, and, more particularly, to cellular modems.

The wide spread use of portable cellular telephones in circuit-switched analog wireless data solutions have brought into focus an additional problem—battery life for these portable cellular telephones. For example, a typical mobile-end user configuration is a laptop personal computer (PC) configured with a PCMCIA analog modem that has a "direct connect" interface to the portable cellular telephone. After establishing an circuit-switched analog cellular data connection to a far-end analog modem endpoint, each analog modem expects to receive a constant data carrier signal to maintain synchronization. While it is known to bridge small outages in a data carrier signal caused by cellular impairments like fading, multi-path, etc. (e.g., see U.S. Pat. No. 4,697,281 issued Sep. 29, 1987 to Sullivan), any loss of the data carrier signal for an extended period of time causes the receiving analog modem to drop the data connection. As such, even during periods of mobile-end user inactivity over the data connection, the portable cellular telephone is still powered up (and draining the battery) to continually transmit a data carrier signal from the PCMCIA analog modem to the far-end data communications equipment.

A similar battery problem in circuit-switched analog cellular voice communications is ameliorated by the use of "voice activation technology" (VOX). In particular, it is known that during a voice-only cellular call, if there is a predefined period of silence, then the transceiver of the portable cellular telephone sends a predefined signal (e.g., a tone) to the cellular network and powers-down, e.g., turns off the cellular transmitter to reduce power consumption. It should be noted that the portable cellular telephone does not completely power-off but switches to a lower power state. The predefined signal indicates to the cellular network that the assigned cellular channel should be kept up notwithstanding the loss (temporarily) of the cellular carrier as a result of the power-down. Upon subsequent detection of a voice signal, the transceiver of the portable cellular telephone powers-up to resume communications. This is also referred to in the art as a "Discontinuous Transmission" feature (e.g., see proposed industry standard IS-136.2 "Recommended Text for IS-136 Cellular System Dual Mode Mobile Station-Rasmussen Base Station Traffic Channels and Analog Control Channel Definition of Discontinuous Transmission for Cellular Voice").

Similarly, in the area of packet-switched cellular data communications, known as CDPD (Cellular Digital Packet Data), the discontinuous nature of packet data also allows incorporation of a discontinuous transmission feature to reduce battery drain. Here, a CDPD-compatible portable mobile station autonomously controls the radio transmitter depending on whether there is data to transmit (e.g., see the "CDPD System Specification" from the industry-supported CDPD Forum).

However, in the context of circuit-switched analog cellular data communications the above-described solutions are ineffective. With respect to using the VOX approach, the continuous transmission of a data carrier signal from the cellular modem looks—to the transceiver of the portable mobile phone—like the cellular channel is still in use. Hence, the transceiver will never power-down. Indeed, even if the transceiver powered down, the modems would disconnect due to the disappearance of the data carrier signal. In contrast, the discontinuous transmission feature of the CDPD approach utilizes the inherent discontinuous nature of packet transmission, which is not available in a circuit-switched analog cellular data environment.

SUMMARY OF THE INVENTION

A cellular modem is modified to manage a transmit power level of a cellular transceiver as a function of data transmission during a circuit-switched analog cellular data connection.

In an embodiment of invention, a cellular modem couples a data terminal equipment (DTE) to a portable mobile telephone that includes a cellular transceiver. The cellular modem monitors the activity of a circuit-switched analog cellular data connection between the DTE and a far-end data endpoint, e.g., a computer, through a cellular modem pool. If the circuit-switched analog cellular data connection is idle for a predetermined amount of time, the cellular modem initiates a power-down sequence. For example, the cellular modem uses a protocol, e.g., a predefined tone, to indicate to the cellular modem pool that a power-down is occurring and that the circuit-switched analog data connection is to be put on hold. Upon receiving an acknowledgment from the cellular modem pool, the cellular modem provides a power-down signal to the cellular transceiver, which activates the discontinuous Transmission feature for cellular voice, treating the circuit-switched analog cellular data call just like it was a circuit-switched analog cellular voice call.

As a result of the above, battery drain on a portable mobile phone could be significantly reduced when data is not being sent over an active circuit-switched analog cellular data connection, such as when a mobile end-user is working on a laptop computer while being concurrently logged into an on-line computer service. Also, as a side-benefit, a cellular carrier will see less co-channel interference with circuit-switched analog cellular data calls during those times when the cellular transceiver is inactive.

DETAILED DESCRIPTION

Figure 1:
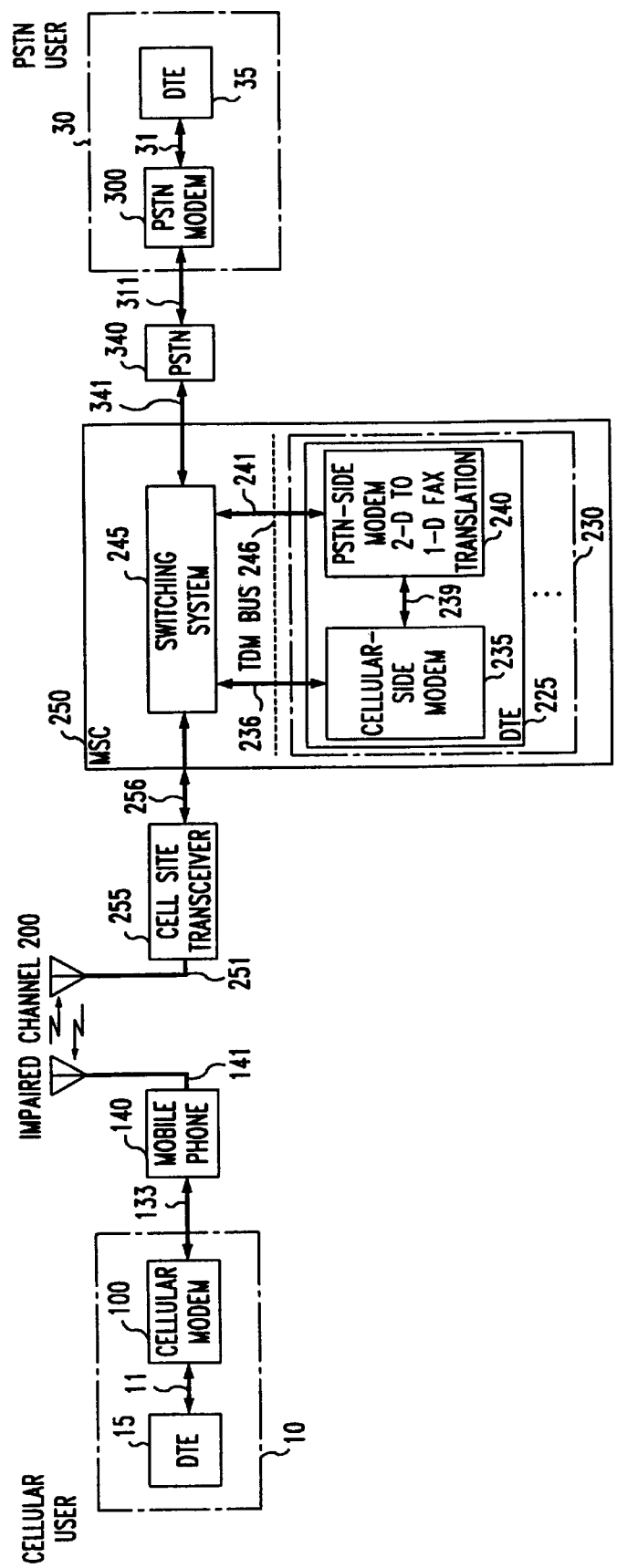
FIG. 1 is an illustrative block diagram of a circuit-switched analog cellular data communications system embodying the principles of the invention.

An illustrative high-level block diagram of a circuit-switched analog cellular data communications system embodying the principles of the invention is shown in FIG. 1. Other than the inventive concept, the elements of FIG. 1 are well-known and will not be described in detail. As used herein, the term "cellular user" is associated with cellular data endpoint 10 and the term "PSTN user" is associated with PSTN data endpoint 30. The cellular data connection will be described in the context of transmitting data from cellular data endpoint 10 to PSTN data endpoint 30. Transmission in the opposite direction, i.e., from cellular data endpoint 10 to PSTN data endpoint 30, occurs in a complementary fashion and will not be described. Also, it is assumed that cellular data endpoint 10 is a laptop personal computer that is illustratively partitioned into a data terminal equipment portion—DTE 15, and an analog modem portion—cellular modem 100, which is assumed to be a PCMCIA-type modem. The PSTN data endpoint 30 is assumed to be a computer system and is partitioned in a similar manner to comprise DTE 35 and PSTN modem 300. Before describing the inventive concept, a brief overview of the cellular data connection is provided.

As illustrated in FIG. 1, an analog cellular data connection is established as known in the art between cellular data endpoint 10 and PSTN data endpoint 30 through cellular modem pool 230. For example, if the cellular user initiates the data call and desires to utilize cellular modem pool 230, the cellular user dials both an access code (e.g., "*DATA") and a telephone number associated with the called party. The access code informs the cellular network to switch the data call through cellular modem pool 230. As shown in FIG. 1, DTE 15 is coupled to cellular modem 100 via DTE/DCE interface 11. The latter represents the signaling, electronics, and wiring, for conforming to a data-terminal-equipment/ data-communications-equipment interface standard like EIA RS-232, or, in this illustrative case, that portion of a PCMCIA equipment bus into which cellular modem 100 is inserted. Cellular modem 100 modulates a data signal from DTE 15 to, typically, a quadrature amplitude modulated (QAM) signal, which is provided on cellular interface 133. The latter couples the QAM signal from cellular modem 100 to mobile phone 140, which includes a battery (not shown). As known in the art, cellular interface 133 may include an RJ11 adapter for coupling the DCE interface of cellular modem 100 to the local signaling interface of the mobile phone, e.g., a form of "direct connect" interface as known in the art. A direct connect interface includes not only signals for the transmission and reception of data, but also control and status signaling that allows cellular modem 100 to pass other information, e.g., a called party telephone number, to mobile phone 140. In accordance with the inventive concept, it is assumed that the direct connect interface is suitably modified to make available the required cellular transceiver (not shown) control leads within mobile phone 140. The direct connect interface can be modified to either add electrical signaling, or by defining a set of control words to control cellular transceiver operation. The cellular transceiver of mobile phone 140 further modulates the QAM signal provided by cellular modem 100 onto a cellular carrier, which is transmitted to cell site transceiver 255, via impaired channel 200. Cell site transceiver 255 demodulates the received cellular signal to provide a received digital version of the QAM signal to Mobile Switching Center (MSC) 250 via facility 256, which is typically a Ti facility.

MSC 250 includes switching system 245 and cellular modem pool 230. As known in the art, switching system 245 provides the received digital version of the QAM signal to modem pair 225 of cellular modem pool 230, via time-division multiplexed (TDM) signaling 236. Modem pair 225 recovers the data signal provided by DTE 15 and remodulates this data signal for transmission over the PSTN portion of the cellular data connection. Modem pair 225 provides this remodulated data signal to the PSTN portion of the data connection via TDM signaling 241. The PSTN portion of the cellular data connection is represented by PSTN facility 341, PSTN 340, and local loop 311. The latter represents the local-loop coupling PSTN modem 300 to a local exchange carrier (not shown) included within PSTN 340. It should be noted that TDM signaling 236 and 241 have been shown separately for simplicity and are representative of allocated time slots of TDM bus 246 that couples each modem pair of cellular modem pool 230 to switching system 245.

Cellular modem pool 230 comprises a number of pairs of back-to-back modems. One such pair is modem pair 225, which is known in the art as a "mu-law" modem pair because modem pair 225 couples directly to TDM bus 246. Modem pair 225 comprises cellular-side modem 235 and PSTN-side modem 240, both of which are coupled together via their DTE interfaces as represented by back-to-back DTE signaling 239. Cellular-side modem 235 and cellular modem 100 terminate the cellular portion of the data connection, while PSTN-side modem 240 and PSTN modem 300 terminate the PSTN portion of the data connection. This allows, for example, cellular-side modem 235 and cellular modem 100 to communicate data using a cellular-oriented protocol like AT&T Paradyne's ETC protocol, and for PSTN-side modem 240 and PSTN modem 300 to communicate data using a more traditional protocol like V.42. As used herein, the term "PSTN portion" also refers to the remaining, i.e., non-cellular, communications channels provided by the PSTN, e.g., T1, local-loop, etc., whether using conducted transmission, e.g., a "tip-ring" pair, or radiated transmission, e.g., microwave transmission.

Figure 2:
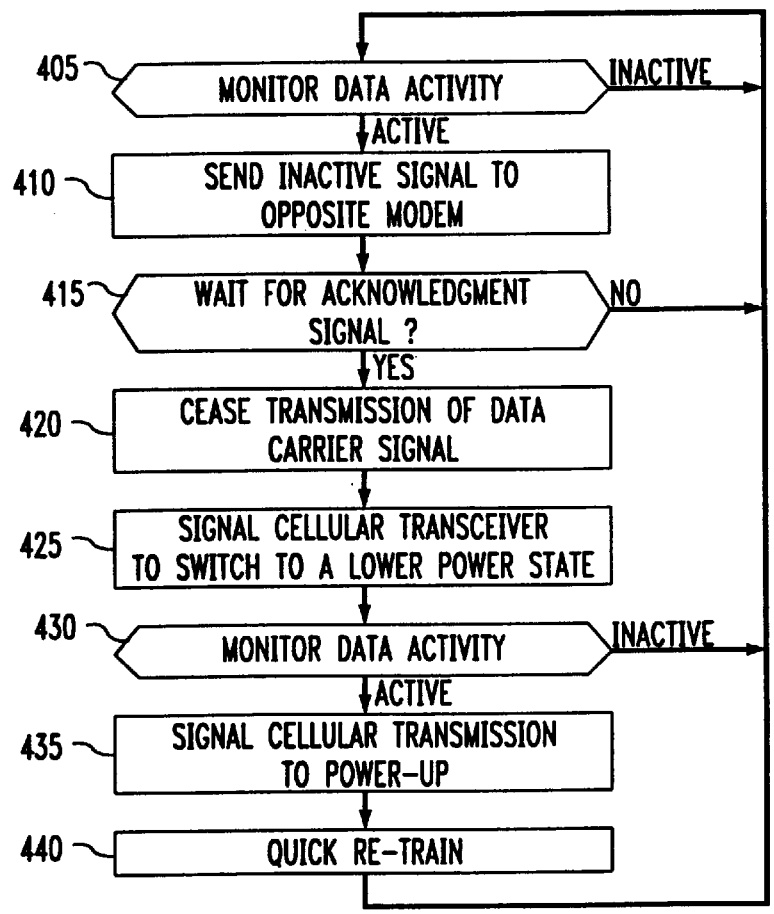
FIG. 2 is an illustrative flow diagram of a method embodying the principles of the invention for use in analog cellular modem 100 of FIG. 1.

Having described the data flow through an established cellular data connection, the inventive concept will now be described. An illustrative flow chart, in accordance with the principles of the invention, is shown in FIG. 2 for use in cellular modem 100. In step 405, cellular modem 100 monitors data activity across the established cellular data connection. As long as cellular modem 100 detects data activity, cellular modem 100 remains in an "active state." Otherwise, cellular modem 100 switches to an "inactive state."

The monitoring of data activity can be done in any of a number of ways. For example, cellular modem 100 can monitor a "request-to-send" (RTS) signal provided by DTE 15. If no RTS signal is requested within a predefined time interval, e.g., 5 seconds, cellular modem 100 switches to the "inactive state." Or, cellular modem 100 can periodically sample the amount of data within an internal data buffer (not shown), and switch to the "inactive state" if the internal data buffer is empty for a predetermined period of time. Or, cellular modem 100 can set a timer (not shown) within cellular modem 100 after each receipt of a byte of data from DTE 15. For example, the timer is set to a predefined time interval and it is assumed that the timer generates an interrupt to a processor (described below) of cellular modem 100 upon expiration of the predefined time interval (although, again, this is not required in a timer-oriented design approach). During periods of data activity, the timer is continually reset upon the receipt of each data byte for transmission and prevented from expiring. However, if the timer expires, cellular modem 100 has detected that no data transfer has occurred for a predefined amount of time. Data inactivity can occur for a number of reasons, e.g., the cellular user is reading a multi-page document on a screen (not shown) of DTE 15 and has nothing for the moment to transmit.

Upon detection of inactivity, cellular modem 100 transmits to the far-end modem an "inactive signal" to the opposite modem in step 410. In this example, the opposite modem is represented by cellular-side modem 235. The "inactive signal" can be any signaling method or protocol and, for simplicity, is assumed to be a predefined tone of a particular frequency and duration. In step 410, cellular modem 100 waits for receipt of "acknowledgment signal" from the opposite modem. Although not necessary to the inventive concept, the "acknowledgment signal" ensures that a) the opposite modem supports the discontinuous transmission of circuit-switched analog cellular data feature, b) the opposite received the "inactive signal," and c) the opposite modem will put the circuit-switched cellular data connection on hold for the time being. It should be noted that to the extent an opposite modem is identified during a training interval, cellular modem 100 may be able to determine a-priori that the opposite modem supports the discontinuous transmission of circuit-switched analog cellular data feature.

The "acknowledgment signal" can be any signaling method and, for simplicity, is assumed to be the same predefined tone. If no "acknowledgment signal" is detected after a predefined time interval, cellular modem 100 returns to the "active state" and goes back to step 405 to continue the process anew. It should be noted that other variations to this approach can be performed. For example, a counter, e.g., a variable, can be established to keep track within cellular modem 100 of the number of times an "inactive signal" was transmitted and no "acknowledgment signal" was received. Upon reaching a predetermined value of the counter, cellular modem 100 can assume that the opposite modem does not support the discontinuous transmission of circuit-switched analog cellular data feature and cease performing steps 405, etc., for this particular cellular data connection. Another variation would simply be to assume that upon the first time an "acknowledgment signal" is not received, the opposite modem does not support the discontinuous transmission of circuit-switched analog cellular data feature and return to the "active state" and cease repeating steps 405, etc., for this particular data connection.

On the other hand, if an "acknowledgment signal" is detected in step 415, cellular modem 100 puts the circuit switched session on hold and ceases transmission of a data carrier signal in step 420. In step 425, cellular modem 100 transmits a "power-down" signal to mobile phone 140 via the above-mentioned direct connect interface and in accordance with the above-described discontinuous transmission feature for cellular voice. In other words, mobile phone 140 operates in accordance with the above-described prior art VOX feature for a voice call notwithstanding a data call is in progress. Upon receipt of the "power-down" signal, mobile phone 140 notifies cell-site transceiver 255 that the assigned cellular channel should be kept up notwithstanding the loss (temporarily) of the cellular carrier as a result of the power-down. As result battery life of the battery (not shown) of mobile phone 140 increases. It should be noted that during the "inactive state," cellular modem 100 must continue to assert any "data-carrier-detect" (DCD) signaling to DTE 15 as known in the art, notwithstanding the fact there is no longer a data carrier signal currently being transmitted or received.

After signaling mobile phone 140 to power-down, cellular modem 100 monitors again for data activity in step 430. As long as cellular modem 100 detects no data activity, cellular modem 100 remains in the "inactive state." Otherwise, cellular modem 100 switches to the "active state" and signals mobile phone 140 to power-up in step 435. In step 440, cellular modem 100 performs a quick re-train with cellular-side modem 235 before sending the data from DTE 15. (Depending on the length of time to perform the quick re-train, a suitable size data buffer must be included within cellular modem 100, or cellular modem 100 can flow-control the data, e.g., by not asserting the equivalent of a "clear-to-send" (CTS) signal). The quick re-train can also be preceded by the transmission of an "activate signal" by cellular modem 100 to cellular-side modem 235 if desired. After step 440, cellular side modem returns to step 405 to continue to monitor data activity and while in the "active state" communicates data between DTE 15 and cellular-side modem 235.

As described above, in changing from the "inactive state" to the "active state," cellular modem 100 performs a quick re-train with cellular-side modem 235 to reestablish synchronization. Normally, at the start of a data connection a set of "connection-related" parameters are determined during a training phase (or determined during a re-train because of deteriorating channel conditions). In this training, or re-training phase, each modem sets values for parameters such as echo canceler coefficients (if any), bit rate, modulation type, etc. Some of these parameter values are determined independently of the far-end modem (like echo canceler coefficients), others are negotiated with the far-end modem (like bit rate). In performing the above-described quick re-train, it is assumed that the values of the connection-related parameters are still valid to quickly re-establish synchronization. Hence, the data connection is re-established at the same bit rate, etc., as was used on the data connection before the data connection was put on hold.

As described above, once cellular modem 100 is in the "inactive state," cellular modem 100 waits for data from DTE 15. However, the longer the data connection is put on hold, the higher the probability that some of the above-described values of the connection-related parameters need adjustment due to changes in the communications channel so that even a quick re-train will only be followed by a longer re-train. This may be seen by the cellular-user as a noticeable delay in the re-starting of communications. Therefore, the above-described method shown in FIG. 2 can be further modified so that cellular modem 100 periodically powers-up the transceiver of mobile phone 140 to perform a quick re-train with cellular-side modem 235 while in the "inactive state." That is, cellular modem 100 periodically re-synchronizes with cellular-side modem 235. If the quick re-train is unsuccessful, a re-train can then be performed transparently to the cellular user if the cellular user still has no data to transmit. After the training, cellular modem 100 again powers-down mobile phone 140. It should be noted that using a periodic re-synchronization feature provides an additional drain on the battery of mobile phone 140. Also, this type of feature will require the use of distinctive signaling, e.g., tones, so that the far-end modem can distinguish a quick re-train while in the "inactive state" from a quick re-train prior to taking the data call off hold.

Figure 3:
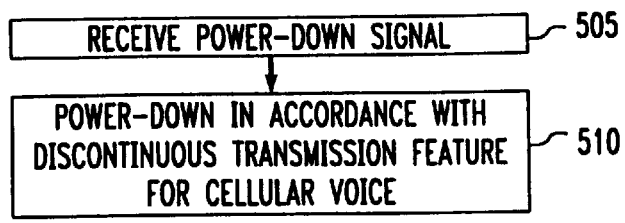
FIG. 3 is an illustrative flow diagram of a method for use in mobile phone 140 of FIG. 1.

An illustrative flow chart for use in mobile phone 140 is shown in FIG. 3. As noted earlier, in accordance with the inventive concept it is assumed that cellular interface 133 is suitably modified to make available the required cellular transceiver (not shown) control leads within mobile phone 140. Cellular interface 133 can be modified to either add electrical signaling, or by defining a set of control words to control cellular transceiver operation. Other than this modification, it is assumed that mobile phone 140 functions as in the prior art in providing the above-described discontinuous transmission feature for cellular voice. In other words, mobile phone 140 operates in accordance with the above-described prior art VOX feature for a voice call notwithstanding a data call is in progress.

Upon receipt of the "power-down" signal in step 505 of FIG. 3, mobile phone 140 powers-down in accordance with the prior art discontinuous transmission feature for cellular voice in step 510. It should be noted that mobile phone 140 does not necessarily completely power-off but switches to a low transmitter power state as defined in the above-referenced industry standard IS-136.2. In this low-power state, the transmitter of mobile phone 140 may be required to either periodically, or upon demand from the cellular network, pass keep-alive information back to the cellular network. Any such cellular network requirements, while further draining the battery, are outside the control of cellular modem 100. Mobile phone 140 can be powered-up in any number of ways. As illustrated in FIG. 2, mobile phone 140 can be powered-up upon receipt of a predefined power-up signal (not shown in FIG. 3). Alternatively, mobile phone 140 can simply monitor the amplitude of the transmitted signal from cellular modem 100 (like it was a voice signal) and upon detection of a transmitted signal return to the power-up state.

Figure 4:
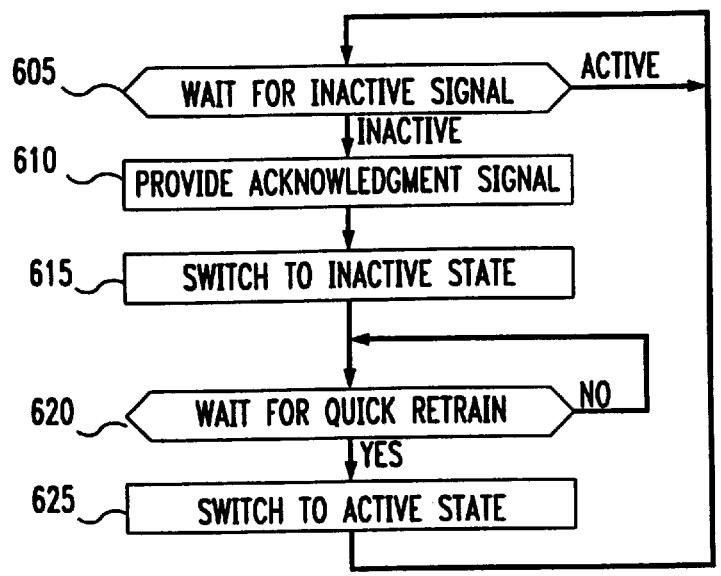
FIG. 4 is an illustrative flow diagram of a method embodying the principles of the invention for use in cellular-side modem 235 of FIG. 1.

An illustrative flow chart, in accordance with the principles of the invention, is shown in FIG. 4 for use in cellular-side modem 235. In step 605, cellular-side modem 235 monitors for reception of the "inactive signal." As long as cellular-side modem 235 does not detect the "inactive signal," cellular-side modem 235 remains in an "active state." Otherwise, upon detection of the "inactive signal," cellular-side modem 235 provides the "acknowledgment signal" in step 610 to cellular modem 100 and switches to the "inactive state" in step 615, thus putting the circuit switched session on hold. At this point, cellular-side modem 235 ceases transmission of a data carrier signal to cellular modem 100 and cellular-side modem 235 continues to assert any "data-carrier-detect" (DCD) signaling to PSTN-side modem 235, notwithstanding the fact there is no longer a data carrier signal currently being transmitted or received over the cellular portion of the data connection.

After switching to the "inactive state," cellular-side modem 235 waits for the above-described quick re-train signal in step 620 (or, alternatively, can wait for the above-mentioned "initiation signal" preceding the quick retrain signaling). After performing the quick re-train (and if necessary an additional re-train), cellular-side modem 235 switches to the "active state" to resume data communications and then returns to step 605 to wait for another "inactive signal."

This inventive concept allows a circuit-switched analog cellular data connection to be put on hold and modifies respective analog modems to ignore the dropping of a data carrier signal for an extended period of time, e.g., on the order of seconds or minutes. However, it may nevertheless be practical to further provide for a data connection time-out to prohibit maintaining a cellular data connection on hold beyond a predefined time interval. For example, a timer could be implemented in cellular modem 100 that only keeps track of the amount of time spent in the "inactive mode." This timer would be reset upon a transition to the "active mode." If the timer value exceeded, e.g., 30 minutes, cellular modem 100 would signal mobile phone 140 to drop the connection via a predefined disconnect signal.

As described above, the stimulus for switching between the "active state" and the "inactive state" was focused on the cellular-end. However, the inventive concept can be suitably modified to allow the far-end modem, e.g., cellular-side modem 235 in the case of a cellular modem pool, to cause the transition from the "inactive state" to the "active state" in those situations when the PSTN user has data to transmit to the cellular user. It should be remembered that the PSTN user is not aware the data connection is on hold. (Even if the PSTN user is, in fact, an on-line computer service, there are occasionally messages sent asynchronously to the logged-in user (here represented by the cellular user) like a notification that electronic mail has been received.) This also assumes that the above-described discontinuous transmission feature for cellular voice provides the cellular network with the ability to awaken mobile phone 140 upon detection of a signal for transmission to the cellular user.

For example, cellular-side modem 235 can transition to the "active state" upon reception of data from PSTN-side modem 240 and begin a quick re-train. The quick retrain signaling is communicated via the cellular network to mobile phone 240, which powers-up and provides the quick re-train signal to cellular modem 100. Upon detection of a received quick re-train, cellular modem 100 performs the quick re-train to resynchronize with cellular-side modem 235, and switches to the "active state" to receive data from cellular-side modem 235. The latter, after completing the quick re-train transmits the data to cellular modem 100 (depending on the length of time to perform the quick re-train, a suitable size data buffer must be included within cellular-side modem 235).

Figure 5:
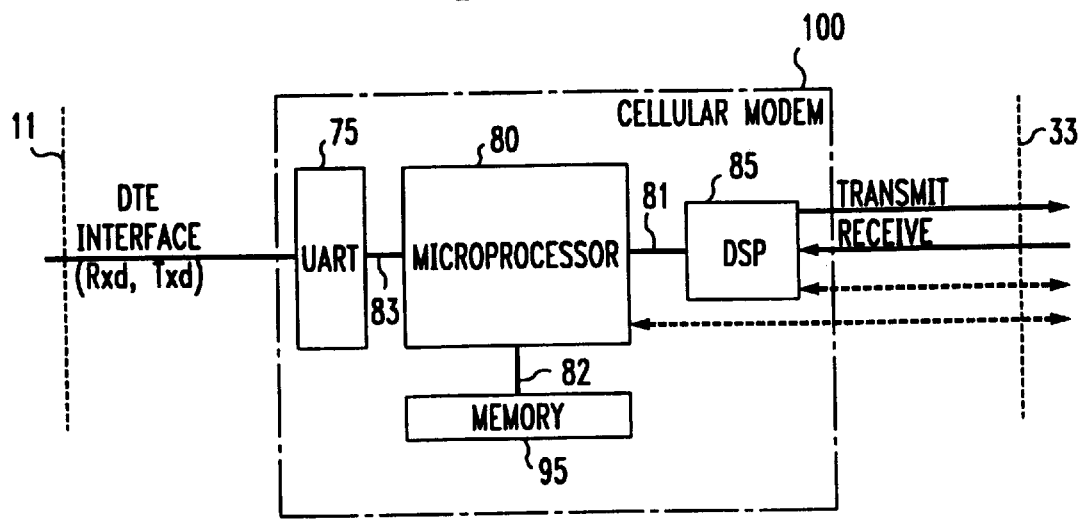
FIG. 5 shows an illustrative block diagram of a modem for use in the cellular communications system of FIG. 1.

FIG. 5 shows an illustrative high-level block diagram of a cellular modem in accordance with the principles of the invention. In particular, cellular modem 100 includes a microprocessor 80, memory 95, a digital signal processor 85, e.g., for providing the tone generator/detector and other modem functions mentioned above, and universal/asynchronous receive transmit (UART) 75 for providing the DTE interface. Microprocessor 80 is coupled to DSP 85 via line 81, which represents, address, data, control, and status leads. The dashed line shown as a part of cellular interface 133 are representative of the above-mentioned direct connect interface to mobile phone 140. In the contexts of this invention, it is assumed that the above-described flow chart of FIG. 2 is implemented in software stored within memory 95. Although not shown, a similar high-level block diagram is applicable to cellular-side modem 235 (except for the dashed lines) for the implementation of the illustrative method of FIG. 4.

As described above, the inventive concept was applied to a cellular modem pool, not because a cellular modem pool is required, but because from a consumer point of view only the cellular user must have a modified modem. The modification of the respective modem in the cellular modem pool to not drop the cellular data connection upon carrier loss is performed by the network provider and the PSTN user is unaffected.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., a modem, etc., the functions of any one or more of those building blocks can be carried out using one or more appropriate programmed processors, e.g., a digital signal processor. In addition, it should be understood that the discrete building blocks can be physically integrated together, e.g., into a radio modem.

Further, although the inventive concept was described in the context of a cellular modem monitoring for data inactivity, the discontinuous transmission of circuit-switched analog cellular data feature can be initiated in other ways. For example, a cellular user can send a predefined "AT-type command" to cellular modem 100, where this predefined "AT-type command" causes cellular modem 100 to initiate a power-down request. Or, the power-down request can be initiated by the far-end data endpoint when cellular modem 100 detects the transmission of a similarly defined "inactive signal" while in the "active state."

Also, it should be noted that this discontinuous transmission of circuit-switched analog cellular data feature can be a configurable option in a cellular modem, e.g., via an "AT-type command." Such a configurable option provides the cellular user an ability to control the power management of the transceiver of mobile phone 140 by cellular modem 100, e.g., whether the feature is enabled or not; or, if enabled, whether a periodic resynchronization is performed or not; etc.

What is claimed:

1. A method for controlling data communication in an analog cellular modem so as to minimize power consumption, the method comprising the steps of:
   establishing a cellular data connection between a data communication device coupled to the analog cellular modem and a far-end data endpoint;
   monitoring the cellular data connection for the existence of a data signal from the data communication device;
   switching to an inactive state when the data signal does not exist for a predefined period of time;
   transmitting an inactive signal to the far-end data endpoint;
   receiving an acknowledgment signal from the far-end data endpoint, the acknowledgment signal indicating that the far-end data endpoint has received the inactive signal;
   transmitting a mobile phone power-down signal to the mobile phone to switch a transceiver of the mobile phone to a low power state, thereby reducing power consumption; and
   periodically powering up the mobile phone and performing a quick retrain with the far-end data endpoint while in the inactive state during a continued absence of the data signal.

2. The method of claim 1 wherein the far-end data endpoint is a cellular-side modem of a cellular modem pool.

3. The method of claim 1 further comprising the step of transmitting a signal representing that a data carrier signal is being received to the data communication device while in the inactive state even though no data carrier signal is being received.

4. The method of claim 1 further comprising the step of detecting the loss of a data carrier signal from the far-end data endpoint for more than one second while in the inactive state and not dropping the data communication.

5. The method of claim 1 further comprising the steps of:
   monitoring the cellular connection for an existence of a data signal from the data communications device while in the inactive state;
   switching to an active state upon detection of the existence of the data signal; and
   providing a transmit signal to the mobile phone for transmission to the far-end data endpoint.

6. The method of claim 5 further comprising the step of providing a power-up signal to the mobile phone before the step of switching to an active state upon detection of the existence of the data signal.

7. The method of claim 5 wherein the transmit signal comprises at least a signal representative of a quick re-train with the far-end data endpoint.

8. The method of claim 7 further comprising a step of performing a quick re-train with the far-end data endpoint by using pre-established values of a set of connection parameters associated with the data connection, wherein the step of performing the quick re-train is subsequent to detection of the data signal.

9. A method of controlling data communication in an analog cellular modem coupled to data terminal equipment so as to minimize power consumption, the method comprising the steps of:
   establishing an analog data connection through a cellular transceiver between the data terminal equipment and a far-end data endpoint;
   putting the analog data connection on hold upon detecting an absence of data transmission activity on the analog data connection for a predefined period of time;
   powering down the cellular transceiver when the analog data connection is on hold, thereby minimizing power consumption;
   periodically powering up the cellular transceiver and performing a quick retrain with the far-end data endpoint while the analog data connection is on hold during a continued absence of the data signal; and
   powering up the cellular transceiver when the analog data connection is not on hold.

10. The method of claim 9 wherein the far-end data endpoint is a part of a cellular modem pool.

11. The method of claim 9, wherein the putting the analog data connection on hold further includes the steps of:
    monitoring the analog data connection for the existence of data transmission activity;
    switching to an inactive state, thereby putting the analog data connection on hold; and
    notifying the far-end data endpoint that the analog data connection is on hold.

12. The method of claim 11 further comprising the step of providing a signal to the data terminal equipment representing that a data carrier signal is being received while in the inactive state even though no data carrier signal is being received.

13. The method of claim 11 further comprising the steps of:
    monitoring the analog data connection to detect the existence of data transmission activity while the analog data connection is on hold; and
    upon detection of data transmission activity, signaling the far-end data communications equipment to remove the analog data connection from hold.

14. The method of claim 13 wherein the data transmission activity is detected from the data terminal equipment.

15. The method of claim 13 wherein the signaling step further includes a step of performing a quick re-train with the far-end data endpoint by using pre-established values of a set of connection parameters associated with the data connection.

16. The method of claim 11 further comprising the step of detecting the loss of a data carrier signal from the far-end data endpoint for more than one second while in the inactive state and not dropping the data connection.

17. A method of controlling data communication in an analog cellular modem so as to minimize power consumption, comprising the steps of:

establishing a data connection with a far-end modem;

monitoring the data connection for an inactive signal transmitted by the far-end analog modem representing that the far-end analog modem is putting the data connection on hold;

transmitting an acknowledgment signal to the far-end data endpoint indicating that the inactive signal has been received;

ceasing transmission of a data carrier signal to the far-end modem while the data connection is on hold without dropping the data connection; and periodically performing a quick retrain with the far-end modem while the data connection is on hold during a continued absence of a data signal from the far-end modem.

18. The method of claim 17 further comprising the step of providing a signal representative of a data carrier detect signal to data terminal equipment coupled thereto while the data connection is on hold even though no data carrier signal is being received.

19. The method of claim 17 further comprising the step of detecting the loss of a data carrier signal from the far-end data endpoint for more than one second while the data connection is on hold and not dropping the data connection.

20. The method of claim 17 further comprising the step of re-starting transmission of the data carrier signal upon detection of a signal transmitted from the far-end analog modem that the data connection is no longer on hold.

21. The method of claim 20 wherein the step of re-staring transmission includes a step of performing a quick re-train with the far-end analog modem by using pre-established values of a set of connection parameters associated with the data connection.

22. The method of claim 17 wherein the analog modem is located within a cellular modem pool.

23. An analog cellular modem for establishing a data connection with a far-end data endpoint via cellular network, comprising:

a data terminal equipment interface for coupling to data terminal equipment to receive data therefrom;

a cellular interface for coupling to a mobile phone; and a processor operating according to software on a memory, the software being configured to monitor the existence of data transmission activity from the data terminal equipment;

place a data call on hold when the data transmission activity does not exist for a predefined amount of time;

transmit an inactive signal to the far-end data endpoint;

receive an acknowledgment signal from the far-end data endpoint;

power down the mobile phone via the cellular interface when the data call is on hold; and periodically power up the mobile phone and perform a quick retrain with the far-end data endpoint while on hold during a continued absence of the data transmission activity.

24. The apparatus of claim 23 wherein the processor causes the data terminal equipment interface to provide a signal representative of data carrier detect to the data terminal equipment when the data call is on hold even though no data carrier signal is being received from a far-end data endpoint.

* * * * *